US008626548B2

(12) United States Patent
Patel

(10) Patent No.: US 8,626,548 B2
(45) Date of Patent: Jan. 7, 2014

(54) ACCESS POINT TRIANGULATION FOR TASK ASSIGNMENT OF WAREHOUSE EMPLOYEES

(75) Inventor: Surilkumar Patel, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1552 days.

(21) Appl. No.: 11/230,816

(22) Filed: Sep. 19, 2005

(65) Prior Publication Data
US 2007/0067200 A1 Mar. 22, 2007

(51) Int. Cl.
*G06Q 10/00* (2012.01)

(52) U.S. Cl.
USPC ....... 705/7.15; 705/7.13; 705/7.16; 705/7.25; 705/7.21; 342/465; 342/463; 702/158; 702/127; 702/155; 340/568.1; 340/539.1; 340/572.1

(58) Field of Classification Search
None
See application file for complete search history.

(56) References Cited

U.S. PATENT DOCUMENTS

| | | | | |
|---|---|---|---|---|
| 5,911,134 A | * | 6/1999 | Castonguay et al. | 705/9 |
| 5,977,913 A | * | 11/1999 | Christ | 342/465 |
| 6,272,472 B1 | * | 8/2001 | Danneels et al. | 705/27 |
| 6,578,005 B1 | * | 6/2003 | Lesaint et al. | 705/8 |
| 6,674,403 B2 | * | 1/2004 | Gray et al. | 342/463 |
| 6,972,682 B2 | * | 12/2005 | Lareau et al. | 340/568.1 |
| 2001/0037229 A1 | * | 11/2001 | Jacobs et al. | 705/8 |
| 2002/0029161 A1 | * | 3/2002 | Brodersen et al. | 705/9 |
| 2002/0072960 A1 | * | 6/2002 | Dabbiere | 705/11 |
| 2002/0103683 A1 | * | 8/2002 | Tsuda et al. | 705/7 |
| 2004/0099736 A1 | * | 5/2004 | Neumark | 235/385 |
| 2004/0167811 A1 | * | 8/2004 | Chien | 705/8 |
| 2004/0181467 A1 | * | 9/2004 | Raiyani et al. | 705/28 |
| 2005/0102203 A1 | * | 5/2005 | Keong | 705/28 |
| 2007/0027732 A1 | * | 2/2007 | Hudgens | 705/7 |
| 2007/0156372 A1 | * | 7/2007 | Christ et al. | 702/158 |

OTHER PUBLICATIONS

MDSI Mobile Data Solutions, www.mdsi-advantex.com, Dec. 5, 1998 [retrieved Apr. 11, 2005], pp. 1-31, retrived from Google.com and archive.org.*
Hightower, Jeffrey, and Gaetano Borriello. "Location systems for ubiquitous computing." Computer 34.8 (2001): 57-66.*

(Continued)

*Primary Examiner* — Jonathan G Sterrett
*Assistant Examiner* — Tzu-Hsiang Lan
(74) *Attorney, Agent, or Firm* — Kilpatrick Townsend & Stockton LLP

(57) ABSTRACT

Systems, methods, and machine-readable media are disclosed to assign one or more tasks to a plurality of warehouse employees. In one embodiment, a method is provided which comprises receiving an order for an item stored in a warehouse. A location of the item in the warehouse can be determined. A current location of each of the warehouse employees can be determined based on a strength of a signal from a wireless device assigned to each of the warehouse employees. The signal can be detected by at least two wireless access points at different location in the warehouse. At least one of the warehouse employees can be selected to fill the order based on the current location of each of the warehouse employees and the locations of the item.

26 Claims, 6 Drawing Sheets

(56) References Cited

OTHER PUBLICATIONS

Petersen, Charles G., and Gerald Aase. "A comparison of picking, storage, and routing policies in manual order picking." International Journal of Production Economics 92.1 (2004): 11-19.*

Roodbergen, Kees Jan, and Rene de Koster. "Routing order pickers in a warehouse with a middle aisle." European Journal of Operational Research 133.1 (2001): 32-43.*

Chew, Ek Peng, and Loon Ching Tang. "Travel time analysis for general item location assignment in a rectangular warehouse." European Journal of Operational Research 112.3 (1999): 582-597.*

Oracle Data Sheet, Oracle Warehouse Management 11i, Apr. 28, 2003, 7 pages.

Cisco Systems White Paper, Wi-Fi Based Real-Time Location Tracking: Solutions and Technology, 1992-2006 Cisco Systems, Inc., 6 pages.

* cited by examiner

ACCESS POINT TRIANGULATION FOR TASK ASSIGNMENT OF WAREHOUSE EMPLOYEES

BACKGROUND OF THE INVENTION

Embodiments of the present invention relate generally to the field of warehouse management systems and more particularly to using access point triangulation in assignment of tasks to warehouse employees.

Large warehouses storing a wide variety of items are typically managed by warehouse management systems ("WMS") that are used to track inventories of items within the warehouse, receive and handle orders for those items, and assign warehouse employees to fill those orders. A WMS is often a complex software package that run on top of a relational database management system ("RDBMS"), such as the Oracle 10 g RDBMS. Oracle Warehouse Management is one example of such a package.

Generally speaking, when an order for an item stored in a warehouse is received, the WMS will assign a task, known as a pick task, to one or more warehouse employees to retrieve the item or items requested by the order from the warehouse to fill the order. One goal of the WMS application is to efficiently allocate tasks to the warehouse employees. Previously, such assignments were made largely at random. More recently, attempts have been made to improve the efficiency of job assignments. This is accomplished by dividing the warehouse into regions or zones with one or more employees assigned to a particular zone. The WMS then determines the zone in which a requested items is located and assigns a pick task for that item to the employee(s) assigned to that zone. That is, the task assignments are made on a per-zone basis.

However, this approach is somewhat inefficient. More specifically, depending upon the items requested, some zones and the employees therein may be idle while other zones are over worked. For example, one item or type of item, such as holiday decorations or a particular toy, may be seasonally very popular. The employee or employees working in a warehouse zone in which such items are stored may be extremely busy filling orders for those items while employees in another zone may be idle.

Furthermore, such a system that assigns tasks on a per-zone basis does not take into consideration an employee's movements throughout the zone or the warehouse while performing various tasks. For example, an employee may move into and out of an assigned zone while performing a pick task or the zone may be vary large causing the employee to move a considerable distance to complete a task. Assigning the tasks based on the zone without consideration of an employees movements leads to inefficiencies since another employee may be closer to a requested item and can more easily fill a request for that item.

Some WMSs try to account for movement of the warehouse employees by allowing or requiring an employee to check into or out of a zone as the employee moves about. That is, the employees can check into a zone when they enter that area, thereby making themselves available for pick tasks within that zone. However, such a check-in and check-out system can actually compound inefficiencies. If an employee fails to check into a zone or check out of his previous zone, assignment of tasks becomes inaccurate and inefficient.

Another approach has been to allow or require the employees to accept or requests new tasks. That is, the employees could request a task and the WMS would find one, either at random or based on the employee's zone, and assign the task to that employee. However, this can also be ineffective and/or inefficient since it can be heavily affected by employee morale and performance and does not address the other shortcomings of a zone-based system.

Hence, there is a need in the art for more efficient methods and systems for assigning tasks to warehouse employees.

BRIEF SUMMARY OF THE INVENTION

Systems, methods, and machine-readable media are disclosed to assign one or more tasks to a plurality of warehouse employees. In one embodiment, a method is provided which comprises receiving an order for an item stored in a warehouse. A location of the item in the warehouse can be determined. A current location of each of the warehouse employees can be determined based on a strength of a signal from a wireless device assigned to each of the warehouse employees. The signal can be detected by at least two wireless access points at different location in the warehouse. At least one of the warehouse employees can be selected to fill the order based on the current location of each of the warehouse employees and the locations of the item. According to one embodiment, the method can further comprise adding a pick task identifying the requested item to an individual queue associated with the selected warehouse employee. The contents of the queue can be viewable by the selected warehouse employee via the wireless device assigned to the selected warehouse employee.

According to another embodiment, the method can further comprise assigning a weighted distance score to each of the warehouse employees based on a distance between the location of the item and the current location of each of the warehouse employees. Selection of at least one of the warehouse employees to fill the order can be based on the weighted distance score. In further embodiments, the method can include determining a current workload for each of the warehouse employees based on a number of pending pick tasks assigned to each of the warehouse employees and assigning a weighted workload score to each of the warehouse employees based on the current workload for each of the warehouse employees. In yet another embodiment, the method can include determining one or more qualifications for each of the warehouse employees and assigning a weighted qualification score to each of the warehouse employees based on the one or more qualifications for each of the warehouse employees and one or more criteria for handling the item. Selection of at least one of the warehouse employees to fill the order can be based on the weighted distance score, the weighted workload score, and/or the weighted qualification score.

According to yet another embodiment, the selection of at least one of the warehouse employees to fill the order further comprises determining whether the selected warehouse employee is available based on a time schedule for the selected warehouse employee.

According to still another embodiment, the method of assign one or more tasks to a plurality of warehouse employees can further comprise determining whether the task has been completed within an allowed time. In response to determining that the task is not completed and the allowed time has expired, at least one new warehouse employee can be selected to fill the order.

According to one embodiment of the present invention, a machine readable medium can have stored thereon a series of instructions which, when executed by a processor, cause the processor to assign one or more tasks to a plurality of warehouse employees by receiving an order for an item stored in a warehouse. A location of the item in the warehouse can be determined. A current location of each of the warehouse employees can be determined based on a strength of a signal from a wireless device assigned to each of the warehouse employees. The signal can be detected by at least two wireless access points at different location in the warehouse. At least one of the warehouse employees can be selected to fill the order based on the current location of each of the warehouse employees and the location of the item. According to one embodiment, a pick task identifying the requested item can be added to an individual queue associated with the selected warehouse employee. The contents of the queue can be viewable by the selected warehouse employee via the wireless device assigned to the selected warehouse employee.

According to still another embodiment, a system can comprise a plurality of wireless access points, each wireless access point positioned at a different location in a warehouse. A plurality of wireless devices can be communicatively coupled with the wireless access points. Each wireless device can be assigned to a different warehouse employee. A warehouse management system can be communicatively coupled with the wireless access points. The warehouse management system can have a memory containing instructions which, when executed by the warehouse management system, cause the warehouse management system to assign one or more tasks to the plurality of warehouse employees by receiving an order for an item stored in the warehouse. A location of the item in the warehouse can be determined. A current location of each of the warehouse employees can be determined based on a strength of a signal from each wireless device as detected by at least two of the wireless access points. At least one of the warehouse employees can be selected to fill the order based on the current location of each of the warehouse employees and the location of the item. A pick task identifying the item can be added to an individual queue associated with the selected warehouse employee. The contents of the queue can be viewable by the selected warehouse employee via the wireless device assigned to the selected warehouse employee.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Embodiments of the present invention include methods, systems, and machine-readable media for determining how to assign tasks to warehouse employees. According to one embodiment of the present invention, "pick tasks," i.e., tasks for collecting items from the warehouse to fill an order, can be assigned to one or more warehouse employees based on the employee's current location and his or her proximity to the requested item or items. In this way, assignment of tasks can be done on an individual basis rather than on a per-zone basis. Furthermore, according to other embodiments of the present invention, assignment of tasks may also be made in consideration of other factors in addition to the current location of the employees. For example, consideration can be given to the workload of each employee, individual qualifications of the employees to perform certain tasks, work schedules of each employee, etc. Again, such considerations are made on a per-employee basis rather than on a per-zone basis.

Figure 1:
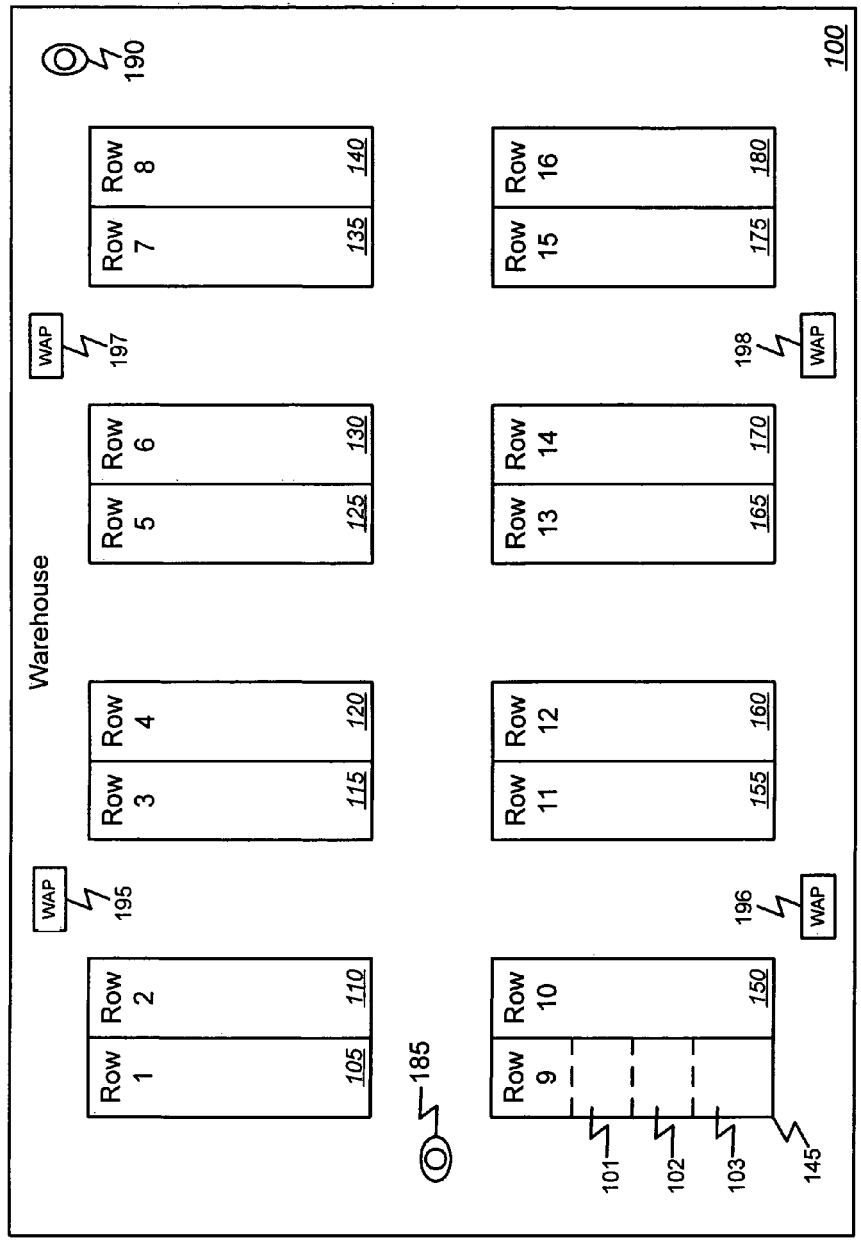
FIG. 1 is a block diagram illustrating an exemplary warehouse for which results of various embodiments of the present invention may be utilized to assign tasks to warehouse personnel.

FIG. 1 is a block diagram illustrating an exemplary warehouse for which results of various embodiments of the present invention may be utilized to assign tasks to warehouse personnel. This example illustrates a warehouse 100 that includes a number of rows 105-180 of shelves or other storage areas for organizing and storing items such as consumer goods, parts, raw materials, etc. Each row 105-180 may have a number of shelves or racks (not shown here) and each shelf or rack may have a number of bins 101-103 for organizing and storing items of different types. So, for example, warehouse 100 can contain a number of different types of products, each assigned to and stored in a particular row, rack, and bin.

The location, quantity and other information about items stored in the warehouse 100 can be tracked and maintained by a warehouse management system (not shown here). Generally speaking, the warehouse management system can receive orders for items stored in the warehouse 100 and then dispatch one or more employees 185 and 190 to retrieve the items and fill the orders. For example, when the warehouse management system receives an order for a particular item, it can determine that the item is stored in a particular bin 101, on a particular shelf of a particular row 145 and assign a certain warehouse employee 185 to retrieve the ordered quantity of the item from that location and take it to a shipping area for packaging and shipping, thereby filling the order.

Each warehouse employee 185 and 190 can be assigned a portable wireless device through which he can receive such assignments or "pick tasks." A plurality of wireless access points 195-198 can be positioned at a different location in the warehouse 100. The wireless devices assigned to the employees 185 and 190 can be communicatively coupled with the wireless access points 195-198 via any of a variety of wireless media such as radio, infrared, etc. Additionally, the warehouse management system can be communicatively coupled, via wired or wireless communications media, with the wireless access points 195-198 to communicate with the wireless devices assigned to the employees 185 and 190. Various types of commonly available wireless networks can be used to provide a communication link between the warehouse management system and the wireless devices of each employee. In this way, the warehouse management system can send a pick task to the wireless device of a given employee identifying a particular items, its location, and a quantity requested. The employee can view the pick task through the wireless device and, in some cases, use it to scan the items as he fills the order so that the inventory maintained by the warehouse management system can be updated.

According to one embodiment of the present invention, the assignment of a pick task to an employee can be based on the current location of the employees 185 and 190 and the location of the item requested. In this case, when the warehouse management system receives an order for an item stored in the warehouse 100, it can determine a location of the item in the warehouse 100 and determine a current location of each of the warehouse employees 185 and 190. The current location of each employee 185 and 190 can be based on a strength of a signal from each wireless device as detected by at least two of the wireless access points 195-198. That is, various types of commonly available wireless networks can give a signal strength indication for devices within range of a particular wireless access point. Such information from one wireless access point gives a vague idea of a general location of a particular device. However, the signal strength of a wireless device detected from two or more wireless access points can be used to triangulate or determine a more precise X,Y location of a particular device within the warehouse.

At least one of the warehouse employees 185 or 190 can be selected to fill the order based on the current location (i.e., X,Y location within the warehouse) of each of the warehouse employees 185 and 190 and the locations of the items as stored in the warehouse management system in terms of an X,Y position within the warehouse 100. That is, an employee can be selected based on being closest to the requested item. So, for example, employee 185 may be selected to fill an order for an item located in row 1 105 since he is currently much closer to that item than employee 190. The proximity of each employee 185 and 190 to a particular item can be determined by the Euclidean, rectilinear, Manhattan, $L_m$ or other measure of linear distance between the location of the requested item stored by the warehouse management system and the current location of each employee 185 and 190 as determined by the strength of the signals received by the wireless access points 195-198.

Once an employee is selected for the task, a pick task identifying the item, the items location, for example in terms of a rack, row, and bin, and the quantity requested can be added to an individual queue associated with the selected warehouse employee. The queue can be located in the wireless device of the employee and/or maintained separately by the warehouse management system. In either case, the contents of the queue can be viewed by the selected warehouse employee via the wireless device assigned to that employee.

Figure 2:
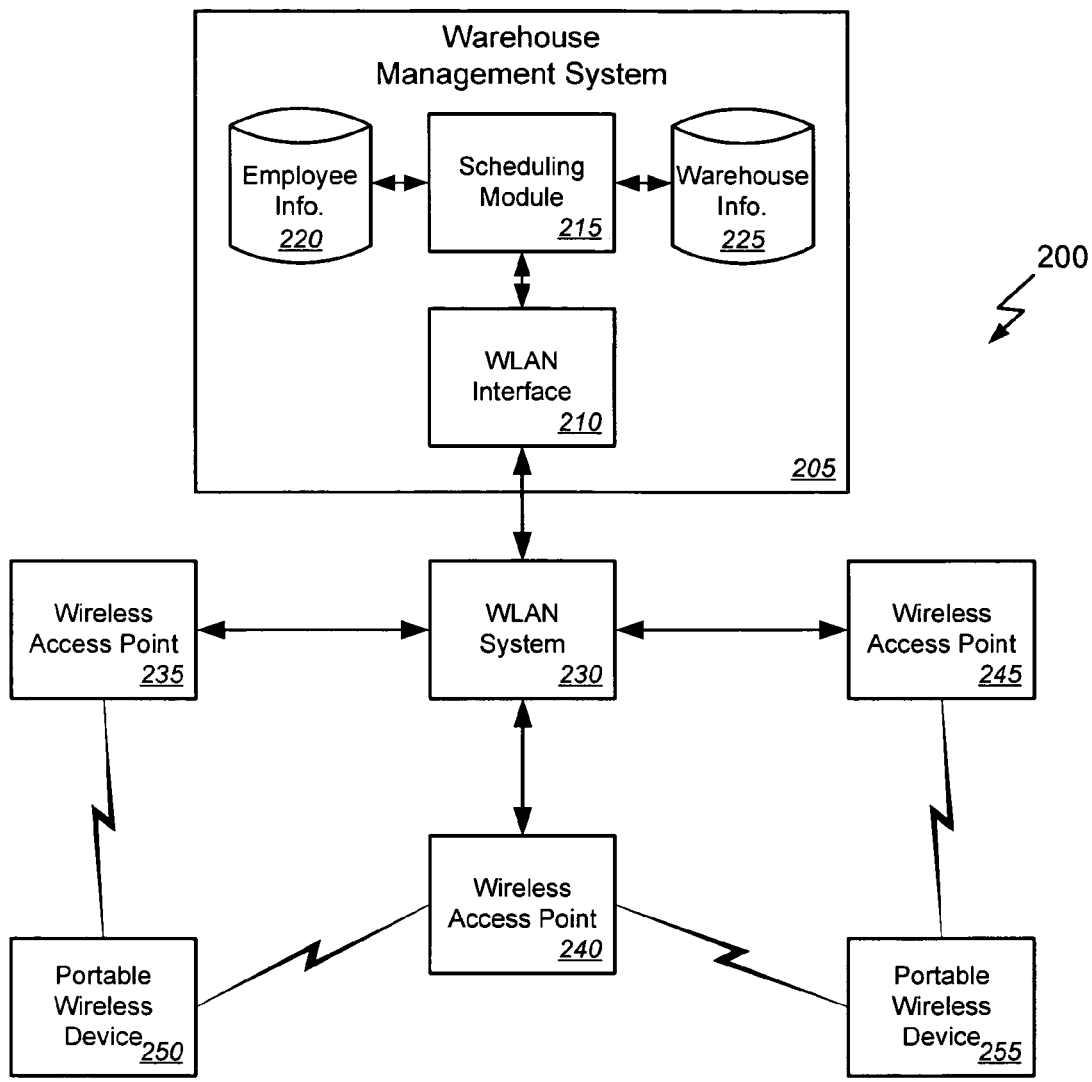
FIG. 2 is a block diagram illustrating functional components of an exemplary environment in which various embodiments of the present invention may be implemented.

FIG. 2 is a block diagram illustrating functional components of an exemplary system in which various embodiments of the present invention may be implemented. This example shows the warehouse management system 205, a Wireless Local Area Network (WLAN) system 230, a number of wireless access points 235-245, and a number of portable wireless devices 250-255. As noted above, the warehouse management system 205 can communicate via wireless access points 235-245 with portable wireless devices 250 and 255 assigned to each warehouse employee. As shown in this example communication between the warehouse management system 205 and the wireless access points 235-245 may be through WLAN system 230 such as a router or bridge.

The warehouse management system 205 can include a WLAN interface 210, a scheduling module 215, and one or more databases of information such as employee information 220 and warehouse information 225. It should be understood that while this information is illustrated here as being in separate stores located within the warehouse management system, other configurations are possible and within the scope of the present invention. For example, employee information 220, warehouse information 225, and/or other information may be stored in a single or separate databases that are part of or separate from the warehouse management system 205.

Regardless of the exact configuration, the location, quantity and other information about items stored in the warehouse can be tracked and maintained by the warehouse management system 205. Generally speaking, the warehouse management system 205 can receive orders for items stored in the warehouse and then dispatch one or more employees to retrieve the items and fill the orders. For example, when the warehouse management system 205 receives an order for a particular item, it can determine, based on information stored in warehouse information 225 that the item is stored in a particular bin on a particular shelf of a particular row and assign a certain warehouse employee to retrieve the ordered quantity of the item from that location and take it to a shipping area for packaging and shipping, thereby filling the order.

As discussed above, each warehouse employee 185 and 190 can be assigned a portable wireless device 250 and 255 through which he can receive such assignments or pick tasks. A plurality of wireless access points 235-245 can be positioned at a different locations in the warehouse. The portable wireless devices 250 and 255 assigned to the employees can be communicatively coupled with the wireless access points 235-245. The warehouse management system 205 can be communicatively coupled with the wireless access points 235-245 via WLAN system 230 and/or WLAN interface 210 to communicate with the portable wireless devices 250 and 255. That is, various types of commonly available wireless networks can be used to provide a communication link between the warehouse management system 205 and the portable wireless devices 250 and 255 of each employee. In this way, the warehouse management system 205 can send a pick task to the wireless device of a given employee identifying a particular item, its location in terms of, for example, a row, rack, and bin, and a quantity requested. The employee can view the pick task through the wireless device and, in some cases, use it to scan the items as he fills the order so that an inventory maintained in warehouse information 225 by the warehouse management system 205 can be updated.

According to one embodiment of the present invention, the assignment of a pick task to an employee can be based on the current location of the employees and the location of the item requested. In this case, when the warehouse management system 205 receives an order for an item stored in the warehouse, it determines a location of the item in the warehouse from previously stored warehouse information 225 and determines a current location of each of the warehouse employees. The current location of each employee can be based on a strength of a signal from each portable wireless device 250 and 255 as detected by at least two of the wireless access points 235-245. As mentioned above, various types of commonly available wireless networks can give a signal strength indication for devices within range of a particular wireless access point. The signal strength of a portable wireless device 250 detected from two or more wireless access points 235 and 240 can be used to triangulate or determine an X,Y location of the portable wireless device 250 within the warehouse using known techniques. Other wireless networks systems 230 are capable of providing an X,Y location of a wireless device in place of or in addition to a signal strength. In such a case, the warehouse management system 205 does not perform a triangulation based on the signal strength but rather reads the location from the network system 230.

In some cases, the WLAN system 230 provides an Application Program Interface (API) or other interface that a system such as the warehouse management system 205 can use to discover the signal strength or location of one or more wireless devices 250 and 255. In such a case, the warehouse management system 205 can determine the current location of each of the warehouse employees by requesting, invoking, calling, or otherwise initiating the signal strength or location features of the WLAN system 230. In other cases, commonly available WLAN systems maintain a list or table of network attached devices and their current locations. In such cases, an API provided by the WLAN system 230 can be used by the warehouse management system 205 to read this information and discover the locations of the warehouse employees.

At least one of the warehouse employees can be selected to fill the order based on the current location of each of the warehouse employees and the location of the item. That is, an employee can be selected based on being closest to the requested item. The proximity of each employee to a particular item can be determined by the Euclidean, rectilinear, Manhattan, $L_m$ or other measure of linear distance between the X,Y location in the warehouse of the requested item as stored by the warehouse management system 205 in warehouse information 225 and the current X,Y location in the warehouse of each employee as determined by the strength of the signals received by the wireless access points 195-198 or from location information received from WLAN system 230.

As will be discussed in greater detail below, selection of one or more employees to fill an order can also be based on additional information stored in employee information 220. For example, employee information 220 may include but is not limited to, information regarding an employee's job qualifications, work schedule, current work load, etc. Such information, together with information related o the task to be assigned, can be used in combination with the location information in selection of the employee(s) to fill a particular order.

Once an employee is selected for the task, a pick task identifying the item, the item's location, and the quantity requested can be added to an individual queue associated with the selected warehouse employee. The queue can be located in the portable wireless device of the employee and/or maintained separately by the warehouse management system 205 such as in employee information 220. In either case, the contents of the queue can be viewed by the selected warehouse employee via the portable wireless device assigned to that employee.

Figure 3:
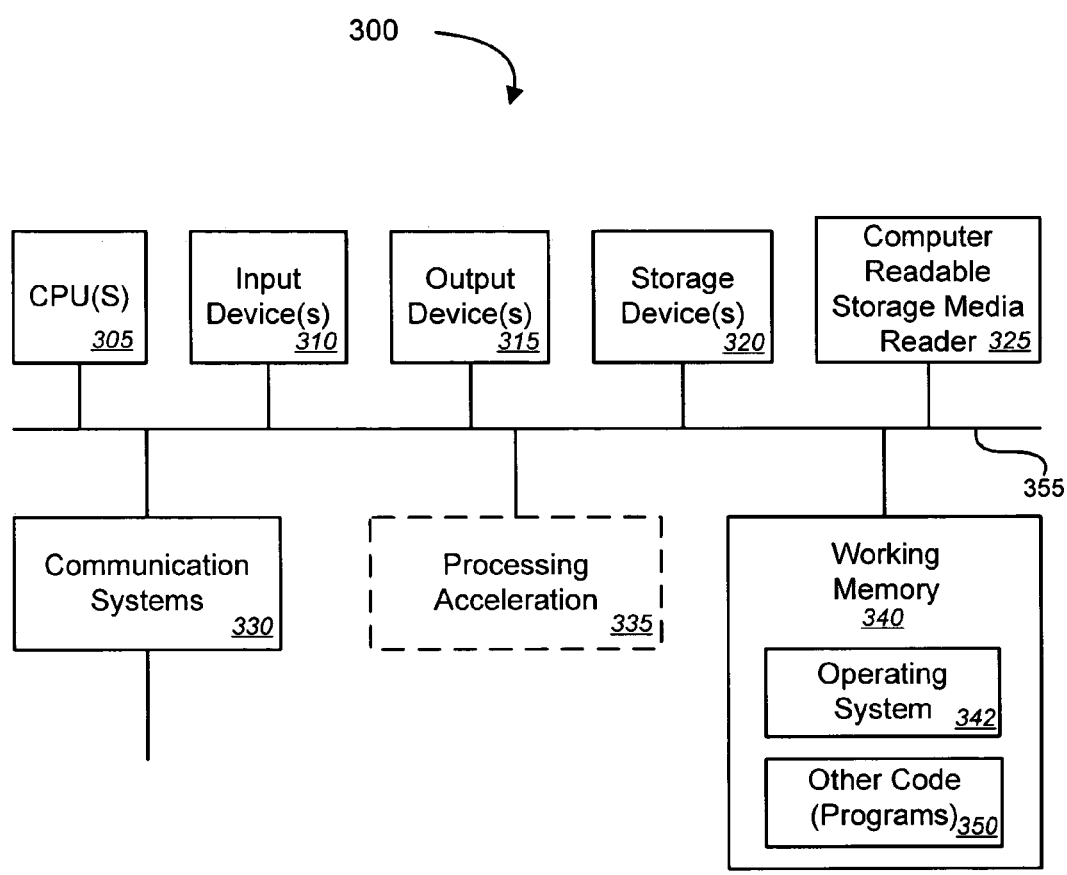
FIG. 3 is a block diagram illustrating an exemplary computer system in which embodiments of the present invention may be implemented.

FIG. 3 is a block diagram illustrating an exemplary computer system in which embodiments of the present invention may be implemented. This example illustrates a computer system 300 such as may be used, in whole, in part, or with various modifications, to provide a warehouse management system or a portable wireless device such as those discussed above.

The computer system 300 is shown comprising hardware elements that may be electrically coupled via a bus 355. The hardware elements may include one or more central processing units (CPUs) 305, one or more input devices 310 (e.g., a mouse, a keyboard, etc.), and one or more output devices 315 (e.g., a display device, a printer, etc.). The computer system 300 may also include one or more storage device 320. By way of example, storage device(s) 320 may be disk drives, optical storage devices, solid-state storage device such as a random access memory ("RAM") and/or a read-only memory ("ROM"), which can be programmable, flash-updateable and/or the like.

The computer system 300 may additionally include a computer-readable storage media reader 325, a communications system 330 (e.g., a modem, a network card (wireless or wired), an infra-red communication device, etc.), and working memory 340, which may include RAM and ROM devices as described above. In some embodiments, the computer system 300 may also include a processing acceleration unit 335, which can include a DSP, a special-purpose processor and/or the like.

The computer-readable storage media reader 325 can further be connected to a computer-readable storage medium, together (and, optionally, in combination with storage device(s) 320) comprehensively representing remote, local, fixed, and/or removable storage devices plus storage media for temporarily and/or more permanently containing computer-readable information. The communications system 330 may permit data to be exchanged with the network 320 and/or any other computer described above with respect to the system 300.

The computer system 300 may also comprise software elements, shown as being currently located within a working memory 340, including an operating system 345 and/or other code 350. It should be appreciated that alternate embodiments of a computer system 300 may have numerous variations from that described above. For example, customized hardware might also be used and/or particular elements might be implemented in hardware, software (including portable software, such as applets), or both. Further, connection to other computing devices such as network input/output devices may be employed.

Software 350 of computer system 300 may include code for determining how to more efficiently assign tasks to warehouse employees. As described above, pick tasks can be assigned to one or more warehouse employees based on the employee's current location and his proximity to the requested item of items. In this way, assignment of tasks are performed on an individual basis rather than on a per zone basis. Furthermore, according to other embodiments of the present invention, assignment of tasks may also be made in consideration of other factors in addition to the current location of the employees. For example, consideration can be given to the workload of each employee, individual qualifications of the employees to perform certain tasks, work schedules of each employee, etc. Again, such considerations are made on a per-employee basis rather than on a per-zone basis.

Figure 4:
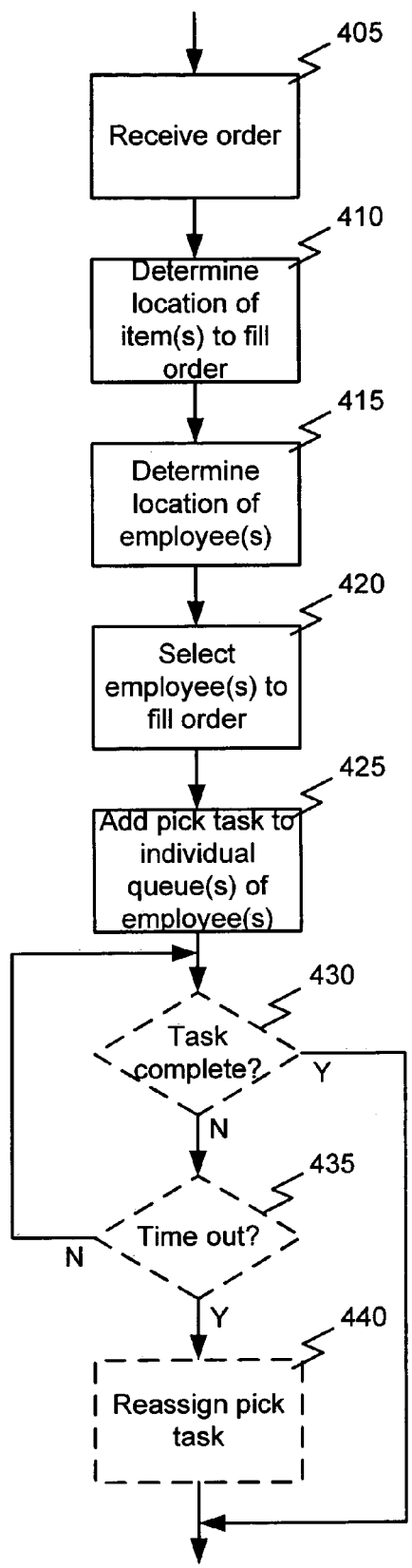
FIG. 4 is a flowchart illustrating, at a high level, a task assignment process according to one embodiment of the present invention.

FIG. 4 is a flowchart illustrating, at a high level, a task assignment process according to one embodiment of the present invention. In this example, a method of assigning one or more tasks to a plurality of warehouse employees comprises receiving 405 an order for an item stored in a warehouse. Generally speaking, the order can indicate one or more items requested and the quantity of each item.

A location of the item in the warehouse can be determined 410. The location, i.e., the row, rack, and bin as well as the X,Y coordinates, can be determined from the warehouse information stored by the warehouse management system. For example, when an item is added to the warehouse, the location in which it is stored, both in terms of the rack, row, and bin or other easily identifiable manner, as well as the X,Y location within the warehouse can be stored in one or more databases or other information stores. This information can then be searched or retrieved when an order is received for that item.

A current location of each of the warehouse employees in terms of an X,Y location within the warehouse can be determined 415. As discussed above, this determination can be based on a strength of a signal from a wireless device assigned to each of the warehouse employees as detected by at least two wireless access points at different location in the warehouse. The location of each device can be triangulated based on the signal strength using common methods. Alternatively or additionally, the location of each wireless device can be read from a wireless network system supporting the wireless devices.

One or more of the warehouse employees can then be selected 420 to fill the order. According to one embodiment, this selection 420 can be based on the current location of each of the warehouse employees and the location of the item. That is, an employee can be selected to fill an order or part of an order based on his proximity to an item requested in the order. The employees proximity to the item can be determined based on Euclidean, rectilinear, Manhattan, $L_m$ or other measure of linear distance between the known location of the item in the warehouse and the employee's current location. As will be discussed in greater detail below with reference to FIGS. 5 and 6, additional criteria may also be considered in the selection 420 of warehouse employees to fill the order.

Once an employee or employees are selected, a pick task identifying the item can be added 425, i.e., inserted, into an individual queue associated with the selected warehouse employee(s). The contents of the queue can be viewed by the selected warehouse employee via the wireless device assigned to that employee.

Optionally, the method can further comprise determining 430 and 435 whether the task has been completed within an allowed time. If 430 the task has not been completed and the allowed time has expired 435, at least one new warehouse employee can be selected 440 to fill the order. That is, the pick task may be removed from the original selected employee's queue and the task can be reassigned by a new selection process or by using results of the previous selection 420 process.

Figure 5:
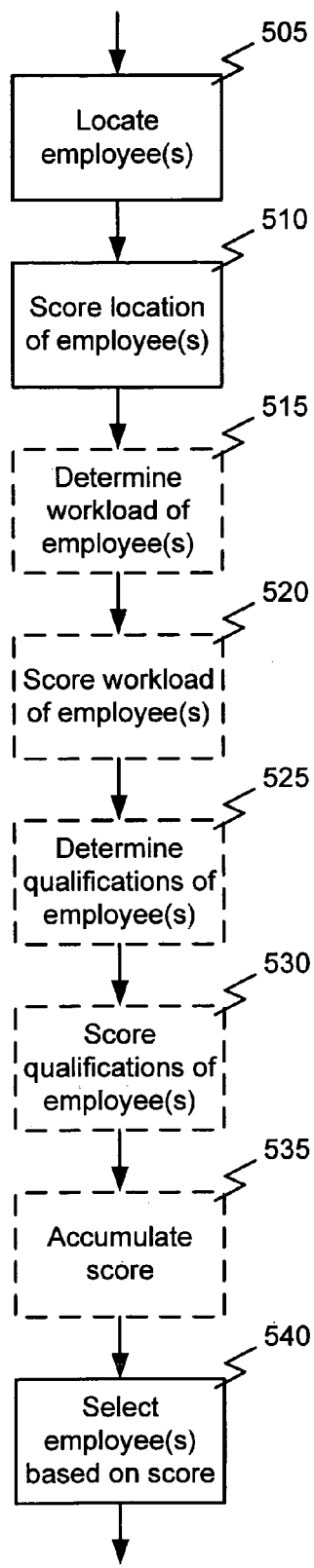
FIG. 5 is a flowchart illustrating a process for selecting warehouse personnel to fill an order according to one embodiment of the present invention.

FIG. 5 is a flowchart illustrating a process for selecting warehouse personnel to fill an order according to one embodiment of the present invention. As noted above, the selection process generally includes consideration of the current location of each warehouse employee and his proximity to the requested item(s). However, additional factors may also be considered. FIG. 5 illustrates an example including a number of additional factors.

In this example, selection begins by determining 505 current locations of each of the warehouse employees 505. As discussed above, this determination can be based on a strength of a signal from a wireless device assigned to each of the warehouse employees as detected by at least two wireless access points at different location in the warehouse. A weighted distance score can be assigned 510 to each of the warehouse employees based on a distance between the location of the item and the current location of each of the warehouse employees. That is, the location of each employee can be assigned a score based on his proximity to the requested item. The score can be also be given a customizable weight relative to the other factors to be considered.

According to one embodiment, the selection process can optionally include determining 515 a current workload for each of the warehouse employees. This determination 515 can be based on a number of pending pick tasks assigned to each of the warehouse employees, i.e., the number of pick tasks in the employee's queue. A weighted workload score can be assigned 520 to each of the warehouse employees based on the current workload for each of the warehouse employees. The score can be also be given a customizable weight relative to the other factors to be considered.

The selection process can also comprise determining 525 one or more qualifications for each of the warehouse employees. Such qualifications can be related to the employee's ability or qualification to perform certain tasks or handle certain items. For example, some employees may be qualified to operate certain equipment such as forklifts or cranes while others are not. In another example, some employees may be qualified to handle certain types of materials such as hazardous materials while others are not. The requirements for handling a particular requested item can be determined based on information maintained by the warehouse management system. Therefore, the requirements for a requested item can be read from this information and each employee can be scored against these requirements based on his qualifications. A weighted qualification score can then be assigned 530 to each of the warehouse employees based on the one or more qualifications for each of the warehouse employees and one or more criteria for handling the item. The score can be also be given a customizable weight relative to the other factors to be considered.

The score for each of the selection factors can then be accumulated 535 to form an overall score. One or more of the warehouse employees can then be selected 540 to fill the order based on the accumulated score.

Figure 6:
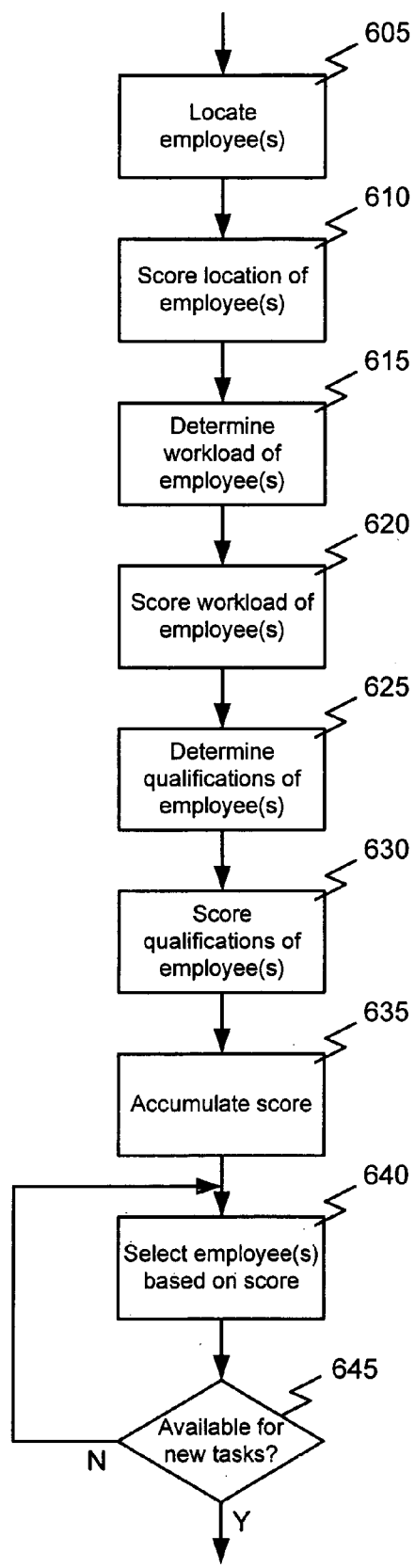
FIG. 6 is a flowchart illustrating a process for selecting warehouse personnel to fill an order according to an alternative embodiment of the present invention.

FIG. 6 is a flowchart illustrating a process for selecting warehouse personnel to fill an order according to an alternative embodiment of the present invention. In this example, selection begins by determining 605 current location of each of the warehouse employees. A weighted distance score can be assigned 610 to each of the warehouse employees based on a distance between the location of the item and the current location of each of the warehouse employees. That is, the location of each employee can be assigned a score based on his proximity to the requested item. The score can be also be given a customizable weight relative to the other factors to be considered.

According to one embodiment, the selection process can also include determining 615 a current workload for each of the warehouse employees. This determination 615 can be based on a number of pending pick tasks assigned to each of the warehouse employees. A weighted workload score can be assigned 620 to each of the warehouse employees based on the current workload for each of the warehouse employees. The score can be also be given a customizable weight relative to the other factors to be considered.

The selection process can also comprise determining 625 one or more qualifications for each of the warehouse employees. Such qualifications can be related to the employee's ability or qualification to perform certain task or handle certain items. The requirements for handling a particular requested item can be determined based on information maintained by the warehouse management system. Therefore, the requirements for a requested item can be read from this information and each employee can be scored against these requirements based on his qualifications. A weighted qualification score can then be assigned 630 to each of the warehouse employees based on the one or more qualifications for each of the warehouse employees and one or more criteria for handling the item. The score can be also be given a customizable weight relative to the other factors to be considered.

The score for each of the selection factors can then be accumulated 635 to form an overall score and one or more of the warehouse employees can then be selected 640 to fill the order based on the accumulated score.

According to one embodiment, selecting at least one of the warehouse employees to fill the order can further comprise determining 645 whether the selected warehouse employee is available based on a time schedule for the selected warehouse employee. That is, the warehouse management system can maintain a work schedule or other time requirements for each employee. For example, one employee may work from 7 AM to 4 PM with a one hour lunch break from 11:30 AM to 12:30

PM. Therefore, he may be removed from consideration or selection outside of his working hours or during his lunch break. Alternatively or additionally, an employee may be considered unavailable for new tasks a short time prior to scheduled breaks or quitting times since the employee may not have time to complete the task. The amount of time may vary depending on the size of the warehouse, the expected time to complete a given task, the nature and/or complexity of a task, etc. Furthermore, an employee may be considered available for new tasks a short time prior to a scheduled start time so that tasks may be available for him immediately upon starting.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of assigning one or more tasks to a plurality of warehouse employees, the method comprising:
   receiving at a warehouse management system an order for an item stored in a warehouse;
   determining with the warehouse management system a stored X-Y coordinate location of the item in the warehouse, wherein the warehouse management system stores for each item a rack, row, and bin location within the warehouse and the X-Y coordinate location of the item in the warehouse;
   determining with the warehouse management system a current X-Y coordinate location of each of the plurality of warehouse employees within the warehouse, the current X-Y coordinate location determined at a time of receiving the order and based on a strength of a signal from a wireless device assigned to each of the plurality of warehouse employees, the signal detected by at least two wireless access points at different known locations in the warehouse;
   assigning with the warehouse management system a weighted distance score to each of the plurality of warehouse employees based on a distance between the X-Y coordinate location of the item and the current X-Y coordinate location of each of the plurality of warehouse employees, wherein the employees of the plurality of employees are not assigned to zones within the warehouse;
   accumulating an overall score for each of the plurality of warehouse employees including the weighted distance score; and
   selecting with the warehouse management system at least one of the plurality of warehouse employees to fill the order based on the overall score for each of the plurality of warehouse employees, wherein selecting at least one of the plurality of warehouse employees to fill the order further comprises determining whether the selected warehouse employee is available based on a time schedule for the selected warehouse employee, wherein the selected employee is considered available for a pre-defined period of time prior to a start time indicated by the time schedule for the selected employee and wherein the selected employee is considered unavailable for a pre-determined period of time prior to a quitting time indicated by the time schedule for the selected employee.

2. The method of claim 1, further comprising adding with the warehouse management system a pick task identifying the item and the rack, row, and bin location of the item to an individual queue associated with the selected warehouse employee, wherein the contents of the queue are viewable by the selected warehouse employee via the wireless device assigned to the selected warehouse employee.

3. The method of claim 2, further comprising:
   determining with the warehouse management system a current workload for each of the plurality of warehouse employees based on a number of pending pick tasks assigned to each of the plurality of warehouse employees the current workload determined at a time of receiving the order; and
   assigning with the warehouse management system a weighted workload score to each of the plurality of warehouse employees based on the current workload for each of the plurality of warehouse employees.

4. The method of claim 3, wherein accumulating the overall score for each of the plurality of warehouse employees further includes the weighted workload score.

5. The method of claim 4, further comprising:
   determining with the warehouse management system one or more qualifications for each of the plurality of warehouse employees; and
   assigning with the warehouse management system a weighted qualification score to each of the plurality of warehouse employees based on the one or more qualifications for each of the plurality of warehouse employees and one or more criteria for handling the item.

6. The method of claim 5, wherein accumulating the overall score for each of the plurality of warehouse employees further includes the weighted qualification score.

7. The method of claim 1, further comprising determining with the warehouse management system whether the task has been completed within an allowed time and responsive to determining that the task is not completed and the allowed time has expired, selecting at least one new warehouse employee to fill the order.

8. A machine readable medium having stored thereon a series of instructions which, when executed by a processor, cause the processor to assign one or more tasks to a plurality of warehouse employees by:
   receiving an order for an item stored in a warehouse;
   determining a stored X-Y coordinate location of the item in the warehouse, wherein the warehouse management system stores for each item a rack, row, and bin location within the warehouse and the X-Y coordinate location of the item in the warehouse;
   determining a current X-Y coordinate location of each of the plurality of warehouse employees within the warehouse, the current X-Y coordinate location determined at a time of receiving the order and based on a strength of a signal from a wireless device assigned to each of the plurality of warehouse employees, the signal detected by at least two wireless access points at different known location in the warehouse;

assigning a weighted distance score to each of the plurality of warehouse employees based on a distance between the stored X-Y coordinate location of the item and the current X-Y coordinate location of each of the plurality of warehouse employees, wherein the employees of the plurality of employees are not assigned to zones within the warehouse;

determining a current workload for each of the plurality of warehouse employees the current workload determined at a time of receiving the order and based on a number of pending pick tasks assigned to each of the plurality of warehouse employees;

assigning a weighted workload score to each of the plurality of warehouse employees based on the current workload for each of the plurality of warehouse employees;

determining one or more qualifications for each of the plurality of warehouse employees;

assigning a weighted qualification score to each of the plurality of warehouse employees based on the one or more qualifications for each of the plurality of warehouse employees and one or more criteria for handling the item, wherein the weighted distance score, the weighted workload score, and the weighted qualification score are weighted based on an importance relative to each other;

accumulating an overall score for each of the plurality of warehouse employees including at least the weighted distance score, the weighted workload score, and the weighted qualification score;

selecting at least one first employee of the plurality of warehouse employees to fill the order based on the overall score of each of the plurality of warehouse employees;

determining whether the first warehouse employee is available based on a time schedule for the first warehouse employee, wherein the selected employee is considered available for a pre-defined period of time prior to a start time indicated by the time schedule for the selected employee and wherein the selected employee is considered unavailable for a pre-determined period of time prior to a break time or a quitting time indicated by the time schedule for the selected employee; and in response to determining the first warehouse employee is available, adding a pick task identifying the item to an individual queue associated with the first warehouse employee, wherein the contents of the queue are viewable by the first warehouse employee via the wireless device assigned to the first warehouse employee.

9. The machine readable medium of claim 8, further comprising determining whether the task has been completed within an allowed time and responsive to determining that the task is not completed and the allowed time has expired, selecting at least one second warehouse employee to fill the order based on the overall score of each of the plurality of warehouse employees.

10. A system comprising:
a plurality of wireless access points, each wireless access point positioned at a different known location in a warehouse;
a plurality of wireless devices communicatively coupled with the wireless access points, each wireless device assigned to a different warehouse employee of a plurality of warehouse employees;
a warehouse management system communicatively coupled with the wireless access points and comprising a memory containing instructions which, when executed by the warehouse management system, cause the warehouse management system to determine a stored X-Y coordinate location of the item in the warehouse, wherein the warehouse management system stores for each item a rack, row, and bin location within the warehouse and the X-Y coordinate location of the item in the warehouse, determine a current X-Y coordinate location of each of the warehouse employees within the warehouse at a time of receiving the order and based on a strength of a signal from each wireless device as detected by at least two of the wireless access points, assign a weighted distance score to each of the plurality of warehouse employees based on a distance between the X-Y coordinate location of the item and the current X-Y coordinate location of each of the warehouse employees, accumulate an overall score for each of the plurality of warehouse employees, the overall score including at least the weighted distance score, select at least one of the warehouse employees to fill the order based on the overall score of each of the warehouse employees, wherein selecting at least one of the plurality of warehouse employees to fill the order further comprises determining whether the selected warehouse employee is available based on a time schedule for the selected warehouse employee, wherein the selected employee is considered available for a pre-defined period of time prior to a start time indicated by the time schedule for the selected employee and wherein the selected employee is considered unavailable for a pre-determined period of time prior to a quitting time indicated by the time schedule for the selected employee, and add a pick task identifying the item to an individual queue associated with the selected warehouse employee, wherein the contents of the queue are viewable by the selected warehouse employee via the wireless device assigned to the selected warehouse employee.

11. The system of claim 10, wherein the warehouse management system further:
determines a current workload for each of the warehouse employees based on a number of pending pick tasks assigned to each of the warehouse employees; and
assigns a weighted workload score to each of the warehouse employees based on the current workload for each of the warehouse employees, wherein the overall score for each warehouse employee further includes the weighted workload score for each employee.

12. The system of claim 11, wherein the warehouse management system further:
determines one or more qualifications for each of the warehouse employees; and
assigns a weighted qualification score to each of the warehouse employees based on the one or more qualifications for each of the warehouse employees and one or more criteria for handling the item, wherein the overall score for each warehouse employee further includes the weighted qualification score for each employee.

13. The system of claim 12, wherein the warehouse management system further:
determines whether the task has been completed within an allowed time; and responsive to determining that the task is not completed and the allowed time has expired, selects at least one new warehouse employee to fill the order.

14. The method of claim 7, wherein the weighted distance score is weighted based on a relative importance of distance in assigning pick tasks to the plurality of warehouse employees.

15. The method of claim 14, wherein the weighted distance score and the weighted workload score are weighted based on an importance relative to each other.

16. The method of claim 14, wherein the weighted distance score, the weighted workload score, and the weighted qualification score are weighted based on an importance relative to each other.

17. The method of claim 16, wherein the relative importance of the weighted distance score, the weighted workload score, and the weighted qualification score is customizable.

18. The machine readable medium of claim 8, further comprising:
   in response to determining the first warehouse employee is not available, selecting at least one second warehouse employee of the plurality of warehouse employees to fill the order based on the overall score of each of the plurality of warehouse employees;
   determining whether the second warehouse employee is available based on a time schedule for the second warehouse employee; and
   in response to determining the second warehouse employee is available, adding the pick task identifying the item to an individual queue associated with the second warehouse employee, wherein the contents of the queue are viewable by the second warehouse employee via the wireless device assigned to the second warehouse employee.

19. The machine readable medium of claim 18, further comprising:
   determining whether the pick task has been completed before an allowed time has expired; and
   responsive to determining the pick task has not been completed before the allowed time has expired, selecting a third warehouse employee from the plurality of warehouse employees to fill the order based on the overall score for each of the plurality of warehouse employees.

20. The method of claim 7, wherein the distance between the coordinate location of the item and the current location of each of the plurality of warehouse employees is based on one of a Euclidean distance, a rectilinear distance, a Manhattan distance, or an $L_m$ distance between the coordinate location of the item and the current location of each of the plurality of warehouse employees.

21. The machine readable medium of claim 8, wherein the distance between the location of the item and the current location of each of the plurality of warehouse employees is based on one of a Euclidean distance, a rectilinear distance, a Manhattan distance, or an $L_m$ distance between the location of the item and the current location of each of the plurality of warehouse employees.

22. The method of claim 7, wherein the quitting time is a time of a break for the selected employee.

23. The method of claim 22, wherein the starting time is an end time of the break for the selected employee.

24. The method of claim 1, wherein the pre-determined period of time prior to a quitting time indicated by the time schedule for the selected employee during which the selected employee is considered to be unavailable is determined based on one or more of a size of the warehouse, an expected time to fill the order, or a nature of the order.

25. The machine readable medium of claim 8, wherein the pre-determined period of time prior to a break time or a quitting time indicated by the time schedule for the selected employee during which the selected employee is considered to be unavailable is determined based on one or more of a size of the warehouse, an expected time to fill the order, or a nature of the order.

26. The system of claim 10, wherein the pre-determined period of time prior to a quitting time indicated by the time schedule for the selected employee during which the selected employee is considered to be unavailable is determined based on one or more of a size of the warehouse, an expected time to fill the order, or a nature of the order.

* * * * *

UNITED STATES PATENT AND TRADEMARK OFFICE
CERTIFICATE OF CORRECTION

| | |
|---|---|
| PATENT NO. | : 8,626,548 B2 |
| APPLICATION NO. | : 11/230816 |
| DATED | : January 7, 2014 |
| INVENTOR(S) | : Patel |

Page 1 of 1

It is certified that error appears in the above-identified patent and that said Letters Patent is hereby corrected as shown below:

On Title page, column 2, under Other Publications, line 2, delete "retrived" and insert -- retrieved --, therefor.

In the Specification

In column 1, line 48, delete "vary" and insert -- very --, therefor.

In column 7, line 30, delete "related o" and insert -- related to --, therefor.

Signed and Sealed this
Twenty-ninth Day of July, 2014

Michelle K. Lee
*Deputy Director of the United States Patent and Trademark Office*